United States Patent
Takeuchi

(10) Patent No.: US 7,178,277 B2
(45) Date of Patent: Feb. 20, 2007

(54) QUANTUM CRYPTOGRAPHY COMMUNICATION SYSTEM AND QUANTUM CRYPTOGRAPHY KEY DISTRIBUTING METHOD USED IN THE SAME

(75) Inventor: Takeshi Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/959,248

(22) Filed: Oct. 7, 2004

(65) Prior Publication Data

US 2005/0078826 A1    Apr. 14, 2005

(30) Foreign Application Priority Data

Oct. 10, 2003   (JP)   ............................. 2003-351460

(51) Int. Cl.
 *H04K 1/00* (2006.01)
(52) U.S. Cl. .......................... 38/255; 380/28; 380/277; 380/263
(58) Field of Classification Search .................. 380/28, 380/277, 263, 256
See application file for complete search history.

(56) References Cited

U.S. PATENT DOCUMENTS

| 2004/0184603 | A1* | 9/2004 | Pearson et al. ............... 380/28 |
| 2005/0036624 | A1* | 2/2005 | Kent et al. ................... 380/277 |

FOREIGN PATENT DOCUMENTS

| JP | 9-502323 | 3/1997 |
| JP | 2001-77803 | 3/2001 |
| JP | 2001-237818 | 8/2001 |
| JP | 2002-118545 | 4/2002 |
| JP | 2002-124940 | 4/2002 |
| JP | 2003-18144 | 1/2003 |
| JP | 2003179597 | 6/2003 |

OTHER PUBLICATIONS

Donald S Bethune et al., "An Autocompensating Fiber-Optic Quantum Cryptography System Base on Polarization Splitting of Light", IEEE Journal of Quantum Electronics, vol. 36, No. 3, Mar. 2000.
Uchiyama, C. "Basic of quantum mechanics and quantum encryption; Viewpoint of quantum communication channel", Mathematical Chemistry, Japan, Science Co., Ltd., Dec. 1, 1996, vol. 34 No. 12, p. 53-61.
Davies, D.W. and Price, W.L., supervising a translation by Tadahiro Uezono, "Network Security", Nikkei McGraw-Hill, Inc., Dec. 5, 1985, the First Edition & First Print, p. 102-108.

* cited by examiner

*Primary Examiner*—Taghi T. Arani
(74) *Attorney, Agent, or Firm*—Young & Thompson

(57) ABSTRACT

A quantum cryptography communication system includes a first data communication unit; a second data communication unit connected with the first data communication unit by a first optical fiber; and a third data communication unit connected with the second data communication unit by a second optical fiber. A first shared key is generated in the first data communication unit and the second data communication unit, and a second shared key is generated in the second data communication unit and the third data communication unit. The second data communication unit encrypts the first shared key by using the second shared key and then transmits the encrypted first shared key to the third data communication unit on the second optical fiber, and the third data communication unit decrypts the encrypted first shared key by using the second shared key to reproduce the first shared key.

6 Claims, 11 Drawing Sheets

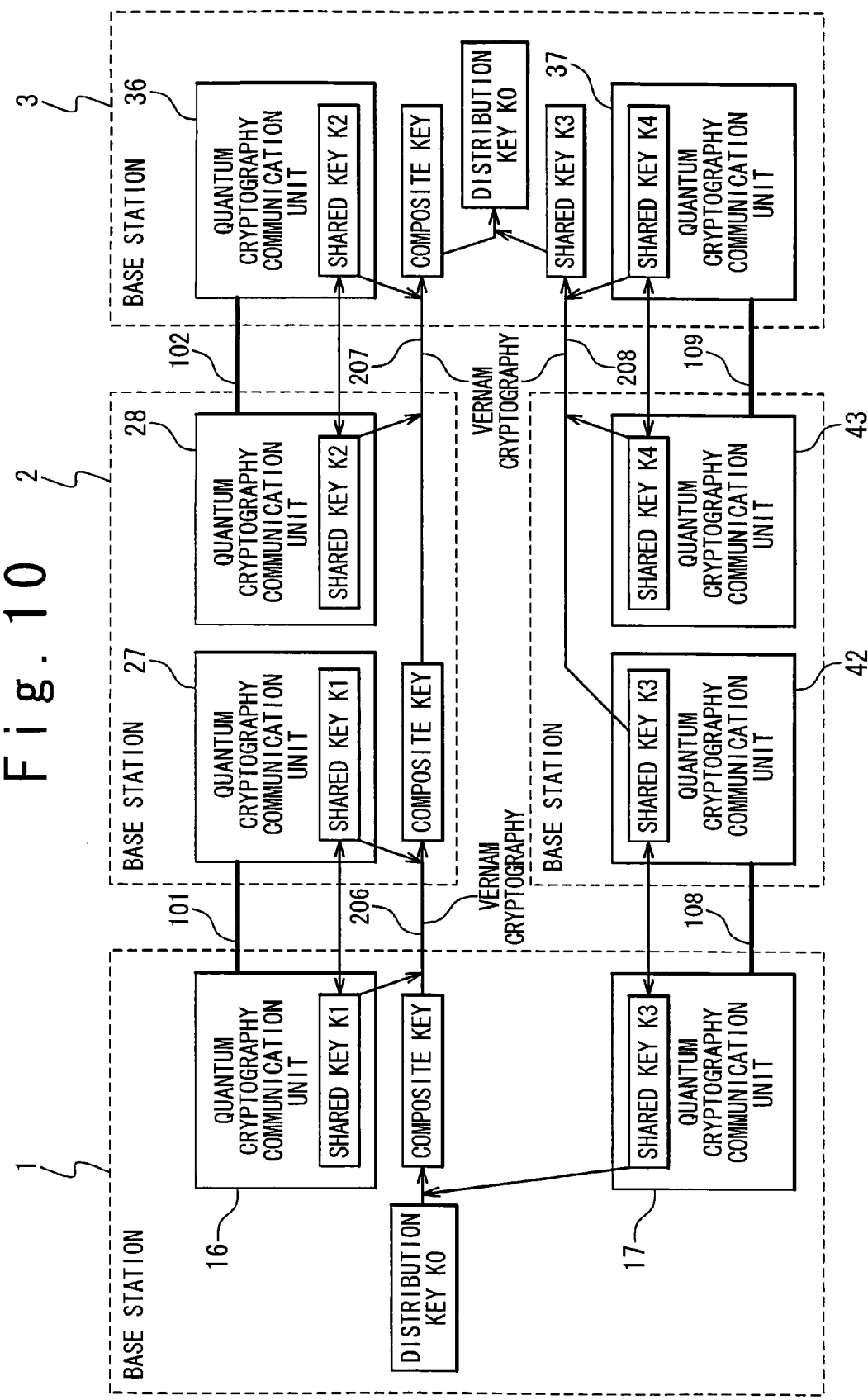

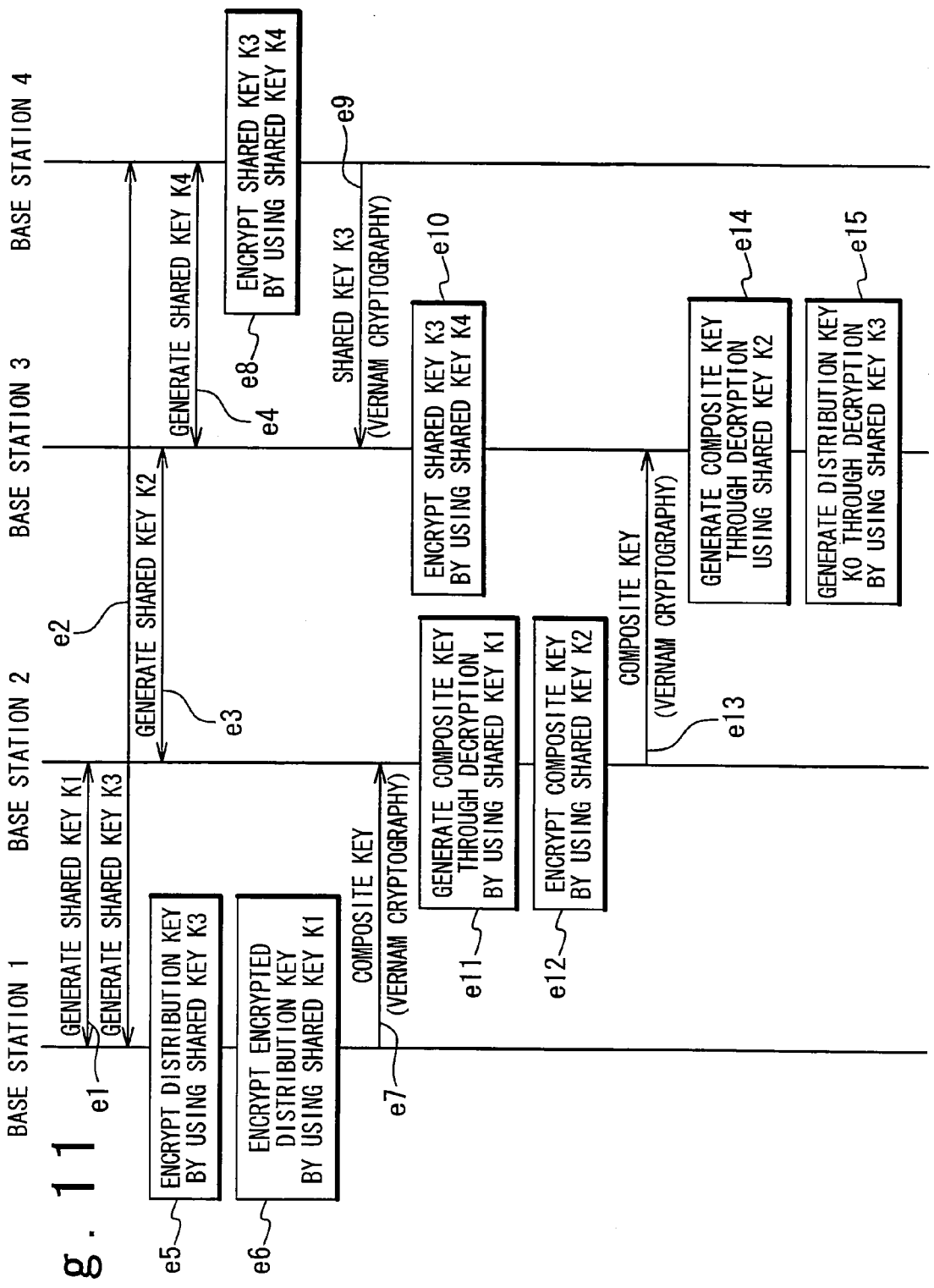

QUANTUM CRYPTOGRAPHY COMMUNICATION SYSTEM AND QUANTUM CRYPTOGRAPHY KEY DISTRIBUTING METHOD USED IN THE SAME

BACKGROUND OF THE INVENTION

1. Field of the Invention

The present invention is related to a quantum cryptography communication system and a quantum cryptography key distributing method employed in this communication system.

2. Description of the Related Art

Very recently, in conjunction with great popularization of the Internet and the like, data are encrypted, in order to avoid eavesdropping or electrical interception of these data. However, even when these data are encrypted based upon cryptography techniques, these encrypted data could be finally eventually decrypted if a plenty of time is used for data decryption. As a consequence, quantum cryptography has been proposed as physically safety communication methods. Quantum cryptography is not cryptography using a numerical sequence which is presently utilized in a general field, but cryptography physically secured based upon the principle of quantum mechanics.

In the conventional cryptography communications, strong light, namely, large amount of photons is sent out in order that the encrypted data can be firmly sent to reception sides, since encryption is carried out using the numeral sequence.

In contrast, in quantum cryptography, only one photon is used to conduct physical characteristics of photon in case of optical communication. In other words, one bit data indicating either "0" or "1" is transmitted by using a single photon in the quantum cryptography.

A structural of a conventional cryptographic communication system is represented in FIG. 1. In the conventional quantum cryptography communicating operation, a base station 5 and another base station 6 generate a shared key in accordance with a quantum cryptography protocol in quantum cryptography communication units 51 and 61 (701 of FIG. 1). The quantum cryptography protocol is described in, for instance, "An Autocompensating Fiber-Optic Quantum Cryptography System Based on Polarization Splitting of Light" by Donald S. Bethune and William P. Risk, (IEEE Journal of Quantum Electronics, Volume 36, No. 3, March in 2000, pages 340 to 347). It should be understood that the quantum cryptography communication unit 51 is connected to the quantum cryptography communication unit 61 by an optical fiber 700.

Next, a data transceiver unit 52 of the base station 5 encrypts a plain text (namely, sentence which has not yet been encrypted) by using this generated shared key to obtain a Vernam cryptograph 702, and then transmits the Vernam cryptograph 702 to the base station 6. A data transceiver unit 62 of the base station 6 decrypts the Vernam cryptograph 702 by using the shared key to obtain the original plain text. It should be noted that the data transceiver unit 52 is connected to the data transceiver unit 62 via a data transfer path 703 which is constructed of a public network, the Internet network, or the like.

In this conventional quantum cryptography communication, as a system for encrypting a plain text by using the shared key, a Vernam cryptography system using a one time pad is used. In a Vernam cryptography system, the encryption is carried out by applying logical calculation to the plain text one bit by one bit by using a random number key, and then the cryptograph is decrypted by using the same random number key.

In the conventional quantum cryptography communication system, very weak light is used in which an average number of photons per one bit is less than one in the quantum cryptography communication protocol. Therefore, a distance between base stations where a shared key is generated is restricted within about 100 Km. That is, a communication system by way of a Vernam cryptograph is similar to a normal optical communicating operation or other communicating operations, and a communication distance is not specifically limited. However, since the distance between the base stations where the shared key required to encrypt and decrypt is generated is restricted within approximately 100 Km, the distance between the base stations between which the cryptography communication can be carried out is also limited to the above-mentioned distance. In other words, in the conventional quantum cryptography communication system using the shared key, the distance between the base stations is restricted to approximately 100 Km or shorter distances, and the shared key cannot be distributed to a remote place exceeding 100 Km.

In conjunction with the above description, a cryptography key distributing system is disclosed in Japanese Laid Open Patent Application (JP-P2001-77803A). The cryptography key distributing system of this conventional example is provided with three or more cryptography key managing units to store secret data. A transmission side unit as one of the cryptography key managing units contains a storage section to store the secret data for the cryptography key managing units, an encrypting section to encrypt the secret data and a transmitting section to transmit the encrypted secret data. A reception side unit as one of the cryptography key managing units contains a receiving section to receive the encrypted secret data, a decrypting section to decrypt the encrypted secret data, and a generating section to generate a common key between the reception side unit and each of the cryptography key managing units based on the secret data obtained through the decryption and the secret data stored in the reception side unit.

Also, a cryptography key distributing system is disclosed in Japanese Laid Open Patent Application (JP-P2002-118545A). In the cryptography key distributing system of this conventional example, a transmission signal is amplified at a plurality of stages while a relation between the transmission signal and noise is kept to meet a predetermined intersect measuring reference, to allow a long distance transmission of a cryptography key. Thus, the cryptography key is distributed by utilizing noise in case of transmission or reception.

Also, a method of multicast communication is disclosed in Japanese Laid Open Patent Application (JP-P2002-124940A). In this conventional example, a transmitting section transmits secret data about encryption to a key management server and transmits data about the encryption to a router 21 and the subsequent. When a key request data is encrypted and transmitted, the routers sequentially add an inherent data and transmit to a receiving section. The receiving section transfers the key request data to the to the key management server and receives decryption keys which are different every route. The transmitting section carries out a calculation $y^{a0}$ to data to be delivered m by using a predetermined value y, and each router carries out a calculation $y^{ak}$ by using the inherent value ak, and calculate a remainder of q. Thus, the calculation result is transmitted as a cryptograph. The receiving section decodes the encrypted data by the routers by using the decryption key K. Thus, a plain text is obtained through single decryption.

Also, a contents delivery system is disclosed in Japanese Laid Open Patent Application (JP-P2003-179597A). In this conventional example, the contents delivery server acquires an encrypt key corresponding to a set of an contents ID and a server ID of a relay server from a cryptography key database in case of delivery to a client terminal. Then, the contents delivery server encrypts contents by using the encrypt key and delivers the encrypted contents to the client terminal via the relay server. The client terminal transmits a ticket request to the contents ID and the server ID, and a ticket server acquires a decrypt key corresponding to the set of the contents ID and the server ID from the cryptography key database, and transmits a ticket containing the decrypt key to the client terminal. The client terminal decrypts the encrypted contents by using the decrypt key.

SUMMARY OF THE INVENTION

An object of the present invention is to provide a quantum cryptography communication system and a quantum cryptography distributing method used in the same, in which a quantum cryptography shared key can be distributed to a destination apparatus which is located far from a source apparatus.

In an aspect of the present invention, a quantum cryptography communication system includes a first data communication unit; a second data communication unit connected with the first data communication unit by a first optical fiber; and a third data communication unit connected with the second data communication unit by a second optical fiber. A first shared key is generated in the first data communication unit and the second data communication unit, and a second shared key is generated in the second data communication unit and the third data communication unit. The second data communication unit encrypts the first shared key by using the second shared key and then transmits the encrypted first shared key to the third data communication unit on the second optical fiber, and the third data communication unit decrypts the encrypted first shared key by using the second shared key to reproduce the first shared key.

In this case, the encrypted first shared key may be transmitted as a Vernam cryptograph.

Also, the first data communication unit may encrypt a plain text by using the first shared key and transmits the encrypted plain text to the third data communication unit on a communication path.

Also, each of the first to third data communication units may be a base station.

Also, the quantum cryptography communication system may further include a fourth data communication unit connected with the third data communication unit by a third optical fiber. A third shared key may be generated in the third data communication unit and the fourth data communication unit. The third data communication unit encrypts the first shared key by using the third shared key and then transmits the encrypted first shared key to the fourth data communication unit on the third optical fiber, and the fourth data communication unit decrypts the encrypted first shared key by using the third shared key to reproduce the first shared key. In this case, the encrypted first shared key may be transmitted as a Vernam cryptograph. Also, the fourth data communication unit may be a base station.

Also, the quantum cryptography communication system may further include a fifth data communication unit connected with the first data communication unit by a fourth optical fiber, and a sixth data communication unit connected with the fifth data communication unit by a fifth optical fiber. A fourth shared key is generated in the first data communication unit and the fifth data communication unit, and a fifth shared key is generated in the fifth data communication unit and the sixth data communication unit. The fifth data communication unit encrypts the fourth shared key by using the fifth shared key and then transmits the encrypted fourth shared key to the sixth data communication unit on the fourth optical fiber, and the sixth data communication unit decrypts the encrypted fourth shared key by using the fifth shared key to produce the fourth shared key. In this case, each of the encrypted first shared key and the encrypted fourth shared key may be transmitted as a Vernam cryptograph. Also, each of the fifth and sixth data communication units may be a base station.

Also, the quantum cryptography communication system may further include a seventh data communication unit connected with the second data communication unit by a sixth optical fiber. A sixth shared key is generated in the first data communication unit and the second data communication unit, and a seventh shared key is generated in the second data communication unit and the seventh data communication unit. The second data communication unit encrypts the sixth shared key by using the seventh shared key and then transmits the encrypted sixth shared key to the seventh data communication unit on the sixth optical fiber, and the seventh data communication unit decrypts the encrypted sixth shared key by using the seventh shared key to produce the sixth shared key. In this case, each of the encrypted first shared key and the encrypted sixth shared key may be transmitted as a Vernam cryptograph. In this case, the seventh data communication unit may be a base station.

In another aspect of the present invention, a quantum cryptography communication system includes a first data communication unit; a second data communication unit connected with the first data communication unit by a first optical fiber; a third data communication unit connected with the first data communication unit by a second optical fiber; and a fourth data communication unit respectively connected with the second and third data communication units by a third and fourth optical fibers. A first shared key is generated in the first data communication unit and the second data communication unit, a second shared key is generated in the second data communication unit and the fourth data communication unit, a third shared key is generated in the first data communication unit and the third data communication unit, and a fourth shared key is generated in the third data communication unit and the fourth data communication unit. The first data communication unit encrypts the first shared key by using the third shared key to produce a composite key, encrypts the composite by using the first shared key, and then transmits the encrypted composite key to the second data communication unit on the first optical fiber, and the second data communication unit decrypts the encrypted composite key to reproduce the composite key, encrypts the composite by using the second shared key, and then transmits the encrypted composite key to the third data communication unit on the second optical fiber. The third data communication unit encrypts the third shared key by using the fourth shared key, and then transmits the encrypted third shared key to the fourth data communication unit on the fourth optical fiber, and the third data communication unit decrypts the encrypted third shared key by using the fourth shared key to reproduce the third shared key, decrypts the encrypted composite key by using the second shared key to reproduce the composite key, and decrypts the composite key by using the third shared key to reproduce the first shared key. In this case, each of the encrypted composite key and the encrypted third shared key may be transmitted as a Vernam cryptograph. Also, each of the first to fourth data communication units may be a base station.

In another aspect of the present invention, a data communication unit includes a first quantum cryptography communication section which hold at least one first key; and a second quantum cryptography communication section which hold at least one second key. The data communication unit decrypts a first cryptograph received from a first data communication unit by using the first key to produce a content, encrypts the content by using the second key to produce a second cryptograph and then transmits the second cryptograph to a first data communication unit. In this case, at least one first key may be generated between the data communication unit and the first data communication unit, and the at least one second key may be generated between the data communication unit and the second data communication unit. Also, the data communication unit encrypts the first key by using the second key when the first cryptograph is not received from the first data communication unit, and then transmits the encrypted first key to the second data communication unit. At least one first key is generated between the data communication unit and the first data communication unit, and the at least one second key is generated between the data communication unit and the second data communication unit. In this case, the second cryptograph may be transmitted as a Vernam cryptograph.

In another aspect of the present invention, a method of distributing a quantum cryptography key, is achieved by generating a first shared key in a first data communication unit and a second data communication unit; by generating a second shared key in the second data communication unit and a third data communication unit; by encrypting the first shared key by using the second shared key in the second data communication unit to transmit the encrypted first shared key to the third data communication unit as a Vernam cryptograph; and by decrypting the encrypted first shared key by using the second shared key in the third data communication unit to reproduce the first shared key.

In this case, the method may be achieved by further including encrypting a plain text by using the first shared key in the first data communication unit to transmit the encrypted plain text to the third data communication unit on a communication path.

Also, the method may be achieved by further including generating a third shared key in the third data communication unit and a fourth data communication unit; encrypting the first shared key by using the third shared key in the third data communication unit to transmit the encrypted first shared key to the fourth data communication unit; and decrypting the encrypted first shared key by using the third shared key in the fourth data communication unit to reproduce the first shared key.

Also, the method may be achieved by further including generating a fourth shared key in the first data communication unit and a fifth data communication unit; generating a fifth shared key in the fifth data communication unit and a sixth data communication unit; encrypting the fourth shared key by using the fifth shared key in the fifth data communication unit to transmit the encrypted fourth shared key to the sixth data communication unit; and decrypting the encrypted fourth shared key by using the fifth shared key in the sixth data communication unit to produce the fourth shared key.

Also, the method may be achieved by further including generating a sixth shared key in the first data communication unit and the second data communication unit; generating a seventh shared key in the second data communication unit and a seventh data communication unit; encrypting the sixth shared key by using the seventh shared key in the second data communication unit to transmit the encrypted sixth shared key to the seventh data communication unit; and decrypting the encrypted sixth shared key by using the seventh shared key in the seventh data communication unit to produce the sixth shared key.

In another aspect of the present invention, a method of distributing a quantum cryptography key, is achieved by generating a first shared key in a first data communication unit and a second data communication unit; by generating a second shared key in the second data communication unit and a fourth data communication unit; by generating a third shared key in the first data communication unit and a third data communication unit; by generating a fourth shared key in the third data communication unit and the fourth data communication unit; by encrypting the first shared key by using the third shared key to produce a composite key, in the first data communication unit; by encrypting the composite by using the first shared key in the first data communication unit to transmit the encrypted composite key to the second data communication unit; by decrypting the encrypted composite key to reproduce the composite key, in the second data communication unit; by encrypting the composite by using the second shared key, in the second data communication unit, to transmit the encrypted composite key to the third data communication unit; by encrypting the third shared key by using the fourth shared key in the third data communication unit to transmit the encrypted third shared key to the fourth data communication unit on the fourth optical fiber; by decrypting the encrypted third shared key by using the fourth shared key in the third data communication unit to reproduce the third shared key; by decrypting the encrypted composite key by using the second shared key in the third data communication unit to reproduce the composite key; and by decrypting the composite key by using the third shared key in the third data communication unit to reproduce the first shared key.

In another aspect of the present invention, a method of distributing a quantum cryptography key, is achieved by decrypting a first cryptograph received from a first data communication unit by using the first key to produce a content; and by encrypting the content by using the second key to produce a second cryptograph to transmit the second cryptograph to a first data communication unit for relay of the content. In this case, the method is achieved by further including generating the at least one first key between the data communication unit and the first data communication unit; and generating the at least one second key between the data communication unit and the second data communication unit. In this case, the method is achieved by further including encrypting the first key by using the second key when the first cryptograph is not received from the first data communication unit; and transmitting the encrypted first key to the second data communication unit.

BRIEF DESCRIPTION OF THE DRAWINGS

FIG. 10 is a block diagram showing the configuration of the quantum cryptography communication system according to a fifth embodiment of the present invention; and FIG. 11 is a sequence chart showing a distribution of a quantum cryptography shared key in the quantum cryptography communication system according to the fifth embodiment of the present invention.

DESCRIPTION OF THE PREFERRED EMBODIMENTS

Hereinafter, a quantum cryptography communication system will be described in detail with reference to the attached drawings. The present invention relates to U.S. patent application Ser. Nos. 10/139,510 and 10/184,371. The disclosures of these applications are incorporated herein by reference.

Figure 1:
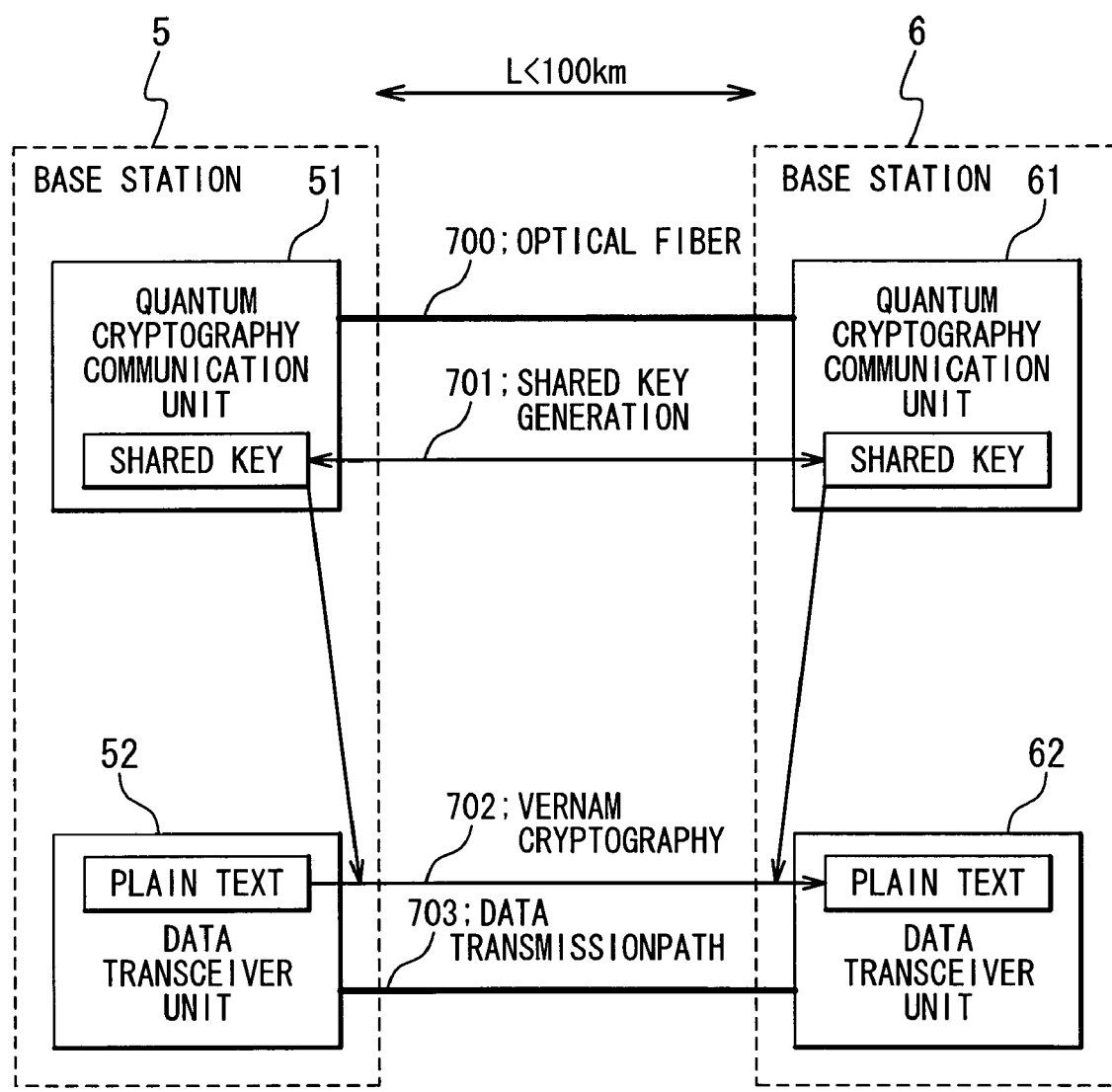
FIG. 1 is a block diagram showing the configuration of a conventional quantum cryptography communication system.
Figure 2:
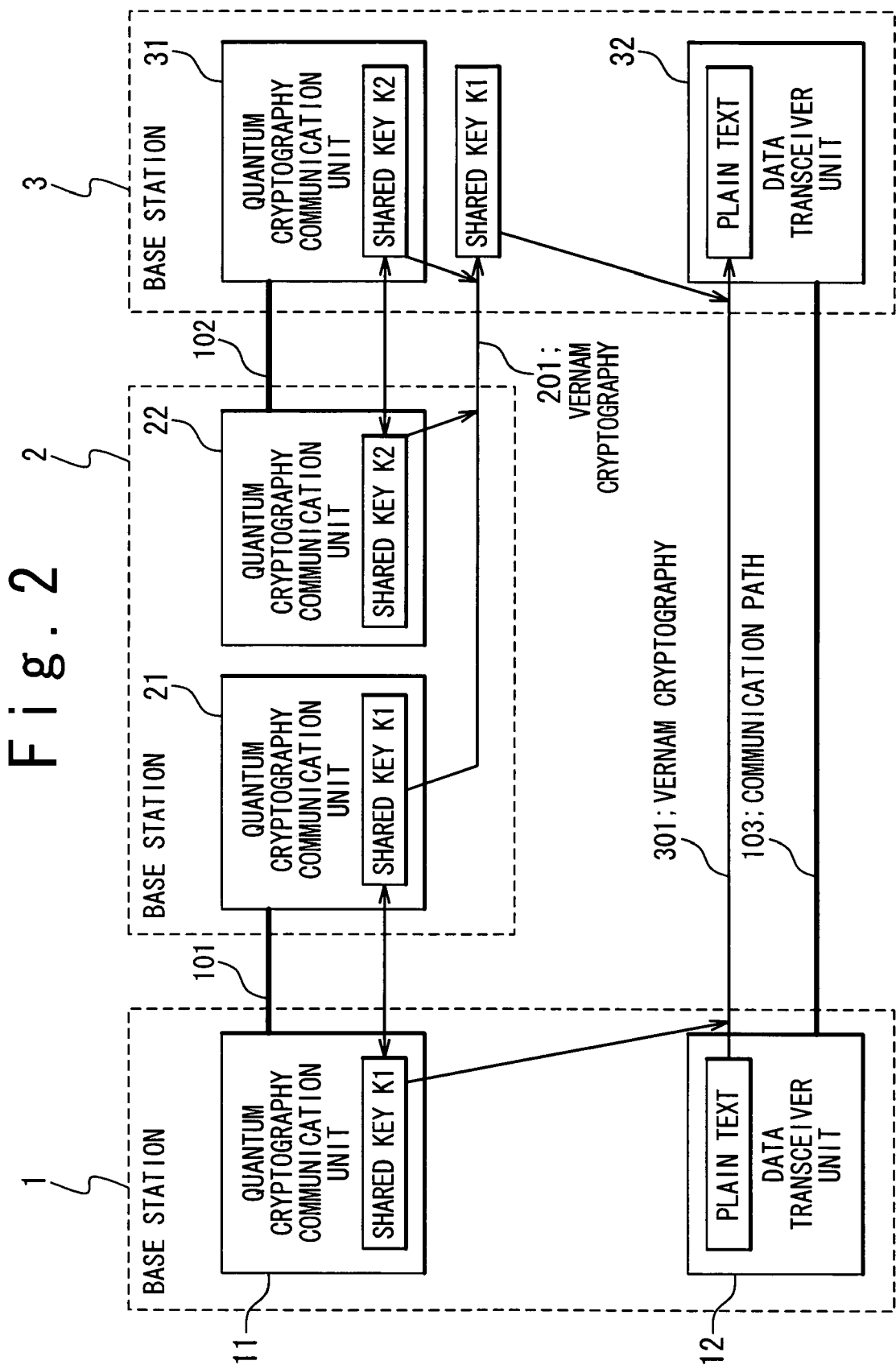
FIG. 2 is a block diagram showing the configuration of a quantum cryptography communication system according to a first embodiment of the present invention.

FIG. 2 is a schematic block diagram showing an entire configuration of a quantum cryptography communication system according to the first embodiment of the present invention. In FIG. 2, the quantum cryptography communication system according to the first embodiment of the present invention contains base stations 1 to 3. The base station 1 is connected to the base station 2 by an optical fiber 101, and the base station 2 is connected to the base station 3 by using another optical fiber 102.

Quantum cryptography shared keys can be generated between the base station 1 and the base station 2, and between the base station 2 and the base station 3 in accordance with a quantum cryptography protocol (for example, refer to Japanese Laid Open Patent application (JP-A-Heisei 9-502323)). These base stations 1 to 3 are provided with quantum cryptography communication units 12, 21 and 22, and 31, respectively, which can carry out the quantum cryptography communication by using the quantum cryptography shared keys. It should be understood that since a distance between the base station 1 and the base station 3 is longer than or equal to 100 Km, the quantum cryptography shared key cannot be directly generated.

Furthermore, the base station 1 is connected to the base station 3 via a communication path 103 such as a public network, a portable telephone network, the Internet network, or the like, and data can be transmitted and received by data transmitting/receiving units 12 and 32 in the base station 1 and the base station 3, respectively.

Figure 3:
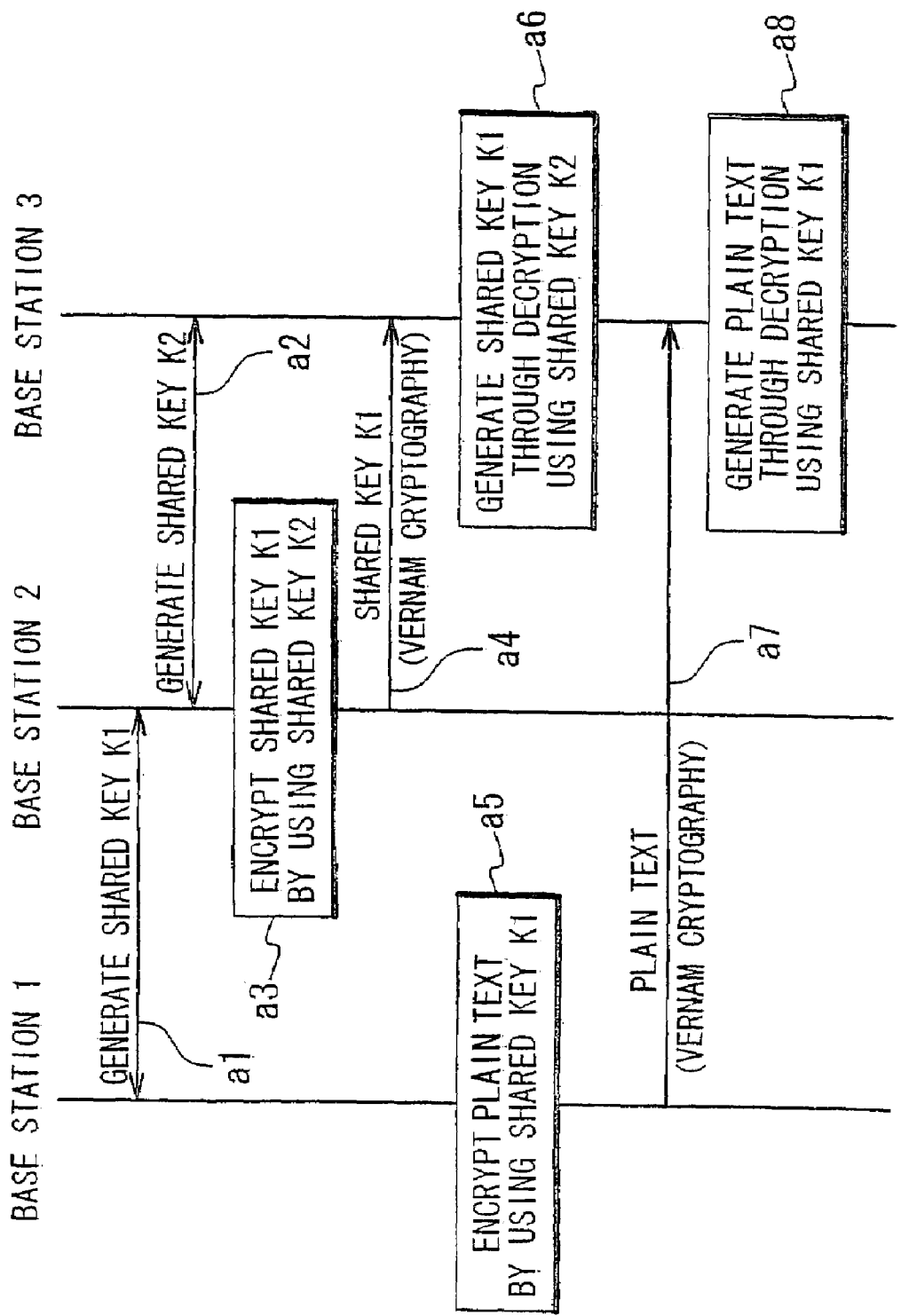
FIG. 3 is a sequence chart showing a distribution of the quantum cryptography shared key in the quantum cryptography communication system according to the first embodiment of the present invention.

FIG. 3 is a sequence chart showing distributions of the quantum cryptography shared keys in the quantum cryptography communication system according to the first embodiment of the present invention. First, a quantum cryptography shared key "K1" is generated (a1 of FIG. 3) between the base station 1 and the base station 2, and another quantum cryptography shared key "K2" is generated (a2 of FIG. 3) between the base station 2 and the base station 3 in accordance with the above-mentioned quantum cryptography protocol.

Subsequently, the base station 2 encrypts the quantum cryptography shared key "K1" by using the quantum cryptography shared key "K2" to produce a Vernam cryptograph 201, and then transmits the Vernam cryptograph 201 to the base station 3 on the optical fiber 102 (a4 of FIG. 3).

In the base station 3, since the Vernam cryptograph 201 transmitted from the base station 2 is decrypted by using the quantum cryptography shared key "K2", the quantum cryptography shared key "K1" is obtained (a6 of FIG. 2). As a result, even when a plain text is encrypted by using the quantum cryptography shared key "K1" in the base station 1 and the encrypted plain text as the Vernam cryptography 301 is transmitted from the base station 1 on the communication path 103 (a5 and a7 of FIG. 3), the base station 3 can decrypt the Vernam cryptograph 301 by using the quantum cryptography shared key "K1". Thus, the plain text can be obtained in the base station 3 (a8 of FIG. 3).

As a consequence, in this first embodiment, the shared key "K1" can be distributed from the base station 1 to the base station 3 by way of the quantum cryptography communication by using the base station 2 as a relay station, while a distance between the base station 1 and the base station 3 is longer than or equal to 100 Km. In this way, the quantum cryptography shared key "K1" can be distributed to the base station 3 which is located far over 100 Km, although the base station 3 could not conventionally directly generate the shared key "k1." It should be understood that although the first embodiment has employed the Vernam cryptography so as to encrypt the shared key "K1" and the plain text, other common key cryptographies may be used.

Figure 4:
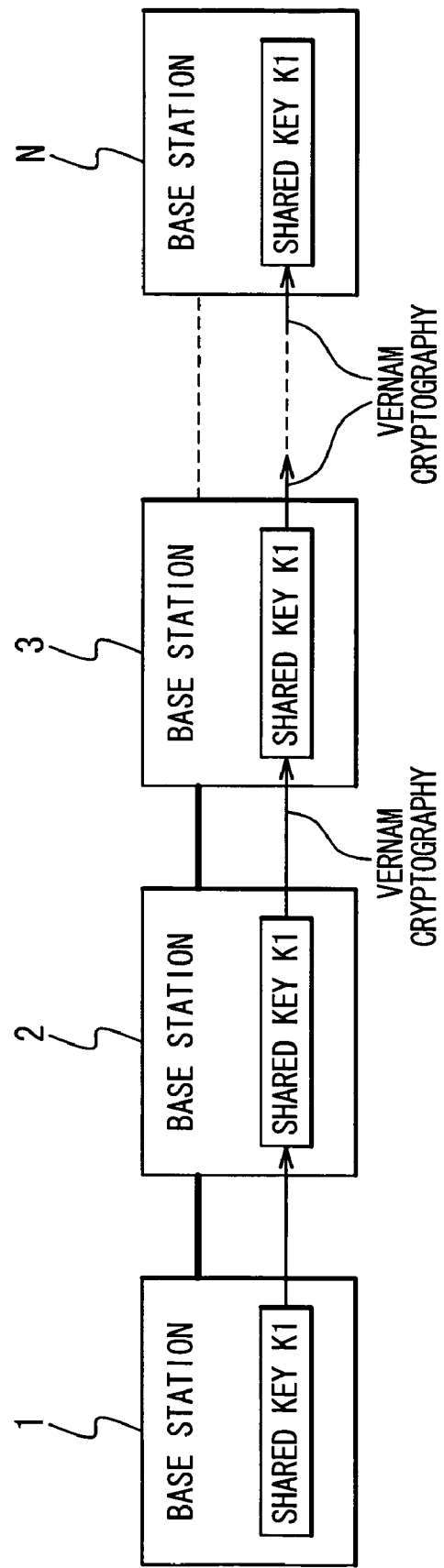
FIG. 4 is a block diagram showing the configuration of the quantum cryptography communication system according to a second embodiment of the present invention.

FIG. 4 is a schematic block diagram for showing the configuration of a quantum cryptography communication system according to the second embodiment of the present invention. In FIG. 4, the quantum cryptography communication system according to the second embodiment of the present invention contains base stations 1 to N (N is an integer larger than 1), and each of the base stations 2 to N–1 contains two quantum cryptography communication units (not shown), like the first embodiment, and generates two quantum cryptography shared keys. By using the generated quantum cryptography shared keys, a quantum cryptography shared key "K1" is successively relayed from a base station 2 to a base station 3, relayed from this base station 3 to a next base station, and relayed from this next base station to a further base station, so that the quantum cryptography shared key "K1" can be distributed up to a base station "N" which is separated far from the above-described base station 3 of the first embodiment of the present invention.

Figure 5:
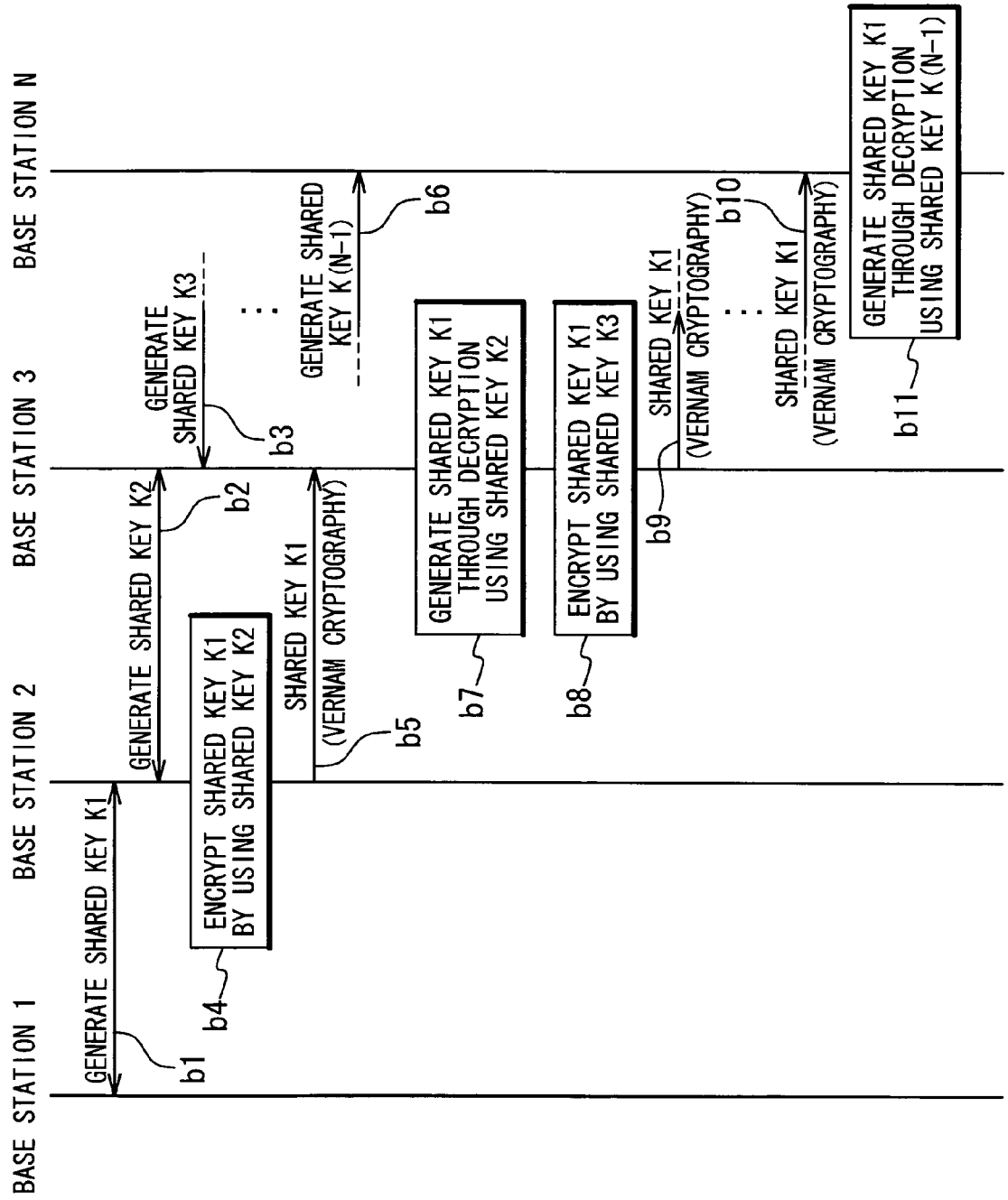
FIG. 5 is a sequence chart showing a distribution of the quantum cryptography shared key in the quantum cryptography communication system according to the second embodiment of the present invention.

FIG. 5 is a sequence chart showing distributions of the quantum cryptography shared keys in the quantum cryptography communication system according to the second embodiment of the present invention. Referring now to FIG. 4 and FIG. 5, the distributions of the quantum cryptography shared keys in the quantum cryptography communication system of the second embodiment will be described.

First, quantum cryptography shared keys "K1" through "K(N−1)" are sequentially generated among two of the base stations located adjacent to each other through an optical fiber in the following manner. That is, the quantum cryptography shared key "K1" is generated based upon the quantum cryptography protocol between the base station 1 and the base station 2 (b1 of FIG. 5), the quantum cryptography shared key "K2" is generated based upon the quantum cryptography protocol between the base station 2 and the base station 3 (b2 of FIG. 5), the quantum cryptography shared key "K3" is generated based upon the quantum cryptography protocol between the base station 3 and the base station 4 (not shown) (b3 of FIG. 5); and a shared key "K(N−1)" of the quantum cryptography is generated based upon the quantum cryptography protocol between the base station N−1 (not shown) and the base station N, which are not shown (b6 of FIG. 5).

Subsequently, the base station 2 encrypts the quantum cryptography shared key "K1" by using the quantum cryptography shared key "K2" to produce a Vernam cryptograph (b4 of FIG. 5), and then transmits the Vernam cryptograph to the base station 3 (b5 of FIG. 5). In the base station 3, since the Vernam cryptograph transmitted from the base station 2 is decrypted by using the quantum cryptography shared key "K2", the quantum cryptography shared key "K1" is obtained (b7 of FIG. 5).

In this way, the quantum cryptography shared key "K1" is encrypted by using a corresponding one of the quantum cryptography shared keys "K2" through "K(N−1)" by each of the adjoining base stations, and then, the Vernam cryptographs are sequentially transmitted between these adjoining base stations in such a manner that the base station 3 encrypts the quantum cryptography shared key "K1" by using the quantum cryptography shared key "K3" to produce a Vernam cryptograph (b8 of FIG. 5), and then, transmits the Vernam cryptograph to the base station 4 (b9 of FIG. 5).

In the base station N, a Vernam cryptograph transmitted from the base station N−1 is decrypted by using the quantum cryptography shared key "K(N−1)", so that the quantum cryptography shared key "K1" (b10 and b11 of FIG. 5).

As a consequence, in this second embodiment, the quantum cryptography shared key "K1" can be distributed from the base station 1 to the base station N, while the base stations 2 to N−1 are employed as the relay points, and a distance between the base station 1 and the base station N is longer than or equal to 100 Km.

Figure 6:
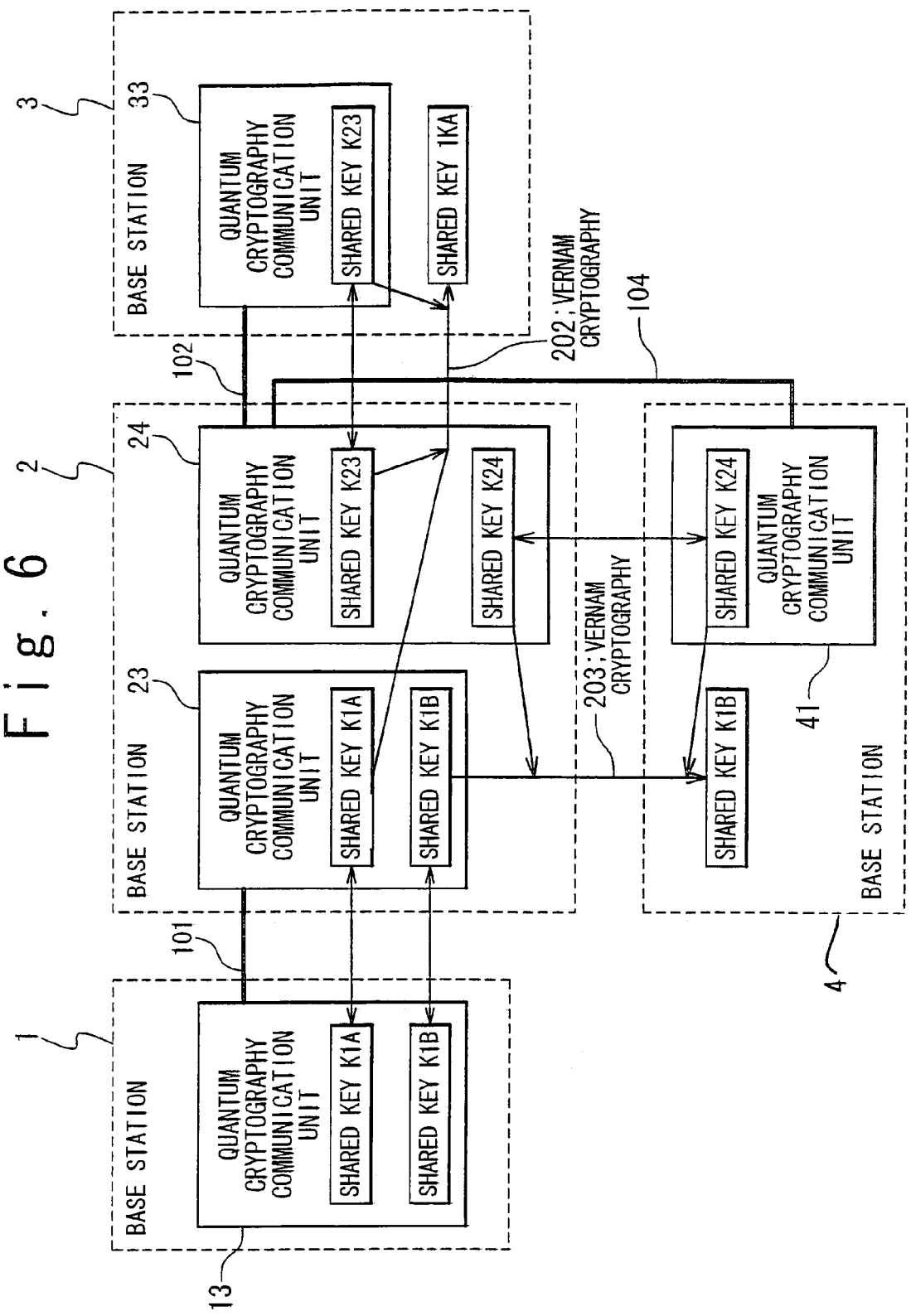
FIG. 6 is a block diagram showing the configuration of the quantum cryptography communication system according to a third embodiment of the present invention.

FIG. 6 is a schematic block diagram showing the configuration of the quantum cryptography communication system according to the third embodiment of the present invention. In FIG. 6, in the quantum cryptography communication system according to the third embodiment of the present invention, quantum cryptography shared keys "K1A" and "K1B" are distributed from a base station 1 to a base station 3 and a base station 4, respectively, by using a base station 2 as a relay point to transfer/relay these shared keys "K1A" and "K1B."

In this quantum cryptography communication system, the base station 1 is connected to the base station 2 by an optical fiber 101, the base station 2 is connected to the base station 3 by an optical fiber 102, and the base station 2 is connected to the base station 4 by an optical fiber 104. Also, the respective base stations 1 to 4 are provided with quantum cryptography communication units 13, 23 and 24, 33, 41 respectively, which are capable of executing cryptography communications with employment of quantum cryptography shared keys.

Figure 7:
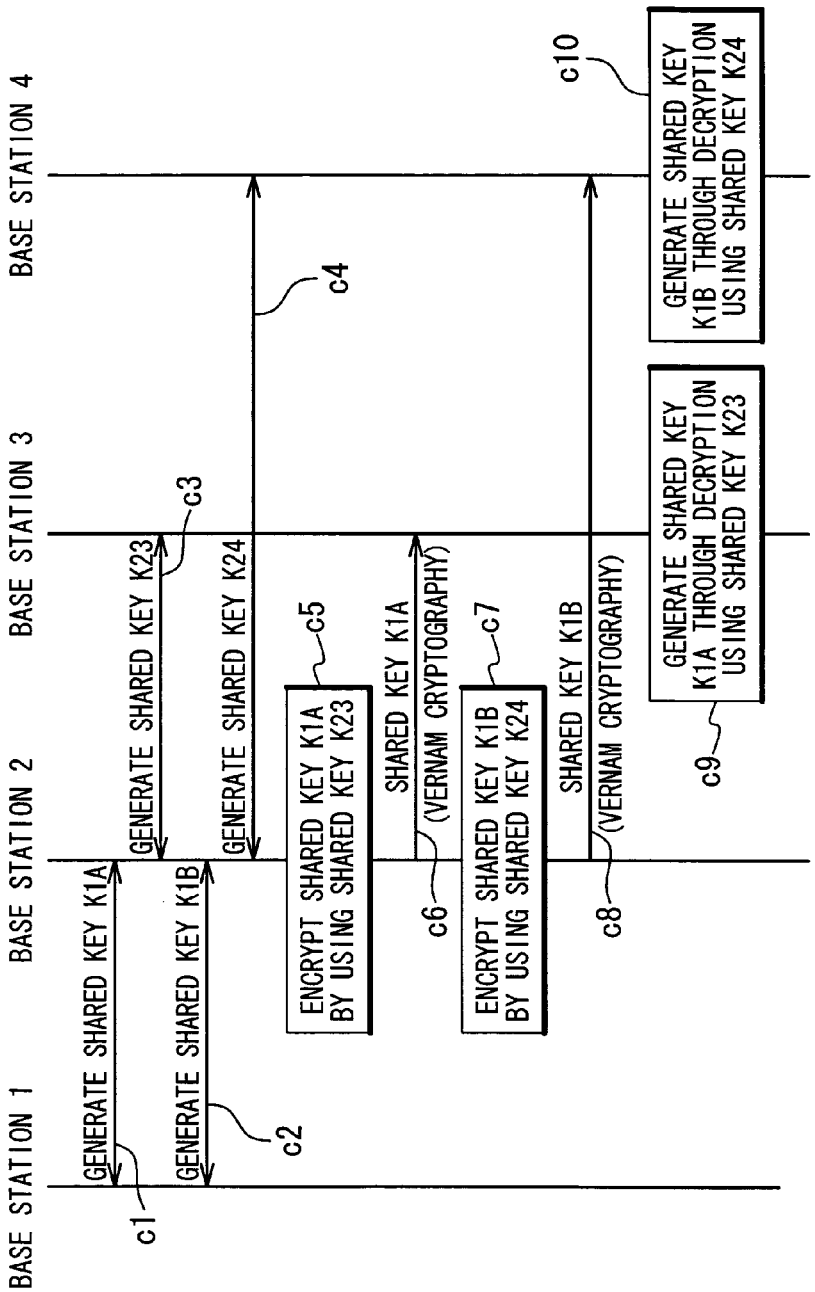
FIG. 7 is a sequence chart showing a distribution of the quantum cryptography shared key in the quantum cryptography communication system according to the third embodiment of the present invention.

FIG. 7 is a sequence chart showing distributions of quantum cryptography shared keys in the quantum cryptography communication system according to the third embodiment of the present invention. Referring now to FIG. 6 and FIG. 7, the quantum cryptography communication unit 13 of the base station 1 generates quantum cryptography shared keys "K1A" and "K1B" based upon the quantum cryptography protocol with respect to the base station 2 (c1 and c2 of FIG. 7), the quantum cryptography communication unit 24 of the base station 2 generates quantum cryptography shared key "K23" with respect to the base station 3 and a quantum cryptography shared key "K24" with respect to the base station 4 based upon the quantum cryptography protocol (c3 and c4 of FIG. 7).

Subsequently, the base station 2 encrypts the quantum cryptography shared key "K1A" by using the quantum cryptography shared key "K23" to produce a Vernam cryptograph 202 (c5 of FIG. 7), and then transmits this Vernam cryptograph 202 to the base station 3 o the optical fiber 101 (c6 of FIG. 7). In the base station 3, the Vernam cryptograph 202 transmitted from the base station 2 is decrypted by using the quantum cryptography shared key "K23", so that the quantum cryptography shared key "K1A" is obtained (c9 of FIG. 7).

Also, the base station 2 encrypts the quantum cryptography shared key "K1B" by using the quantum cryptography shared key "K24" to produce a Vernam cryptograph 203 (c7 of FIG. 7), and then transmits the Vernam cryptograph 203 to the base station 4 on the optical fiber 104 (c8 of FIG. 7). In the base station 4, the Vernam cryptograph 203 transmitted from the base station 2 is decrypted by using the quantum cryptography shared key "K24", so that the quantum cryptography shared key "K1B" is obtained (c10 of FIG. 7).

As a consequence, in the third embodiment, by using the base station 2 as a relay point, the quantum cryptography shared key "K1A" can be distributed from the base station 1 to the base station 3 which is separated from the base station 1 by the distance longer than or equal to 100 Km, and further, the quantum cryptography shared key "K1B" can be distributed from the base station 1 to the base station 4 which is separated from the base station 1 by the distance longer than or equal to 100 km.

Figure 8:
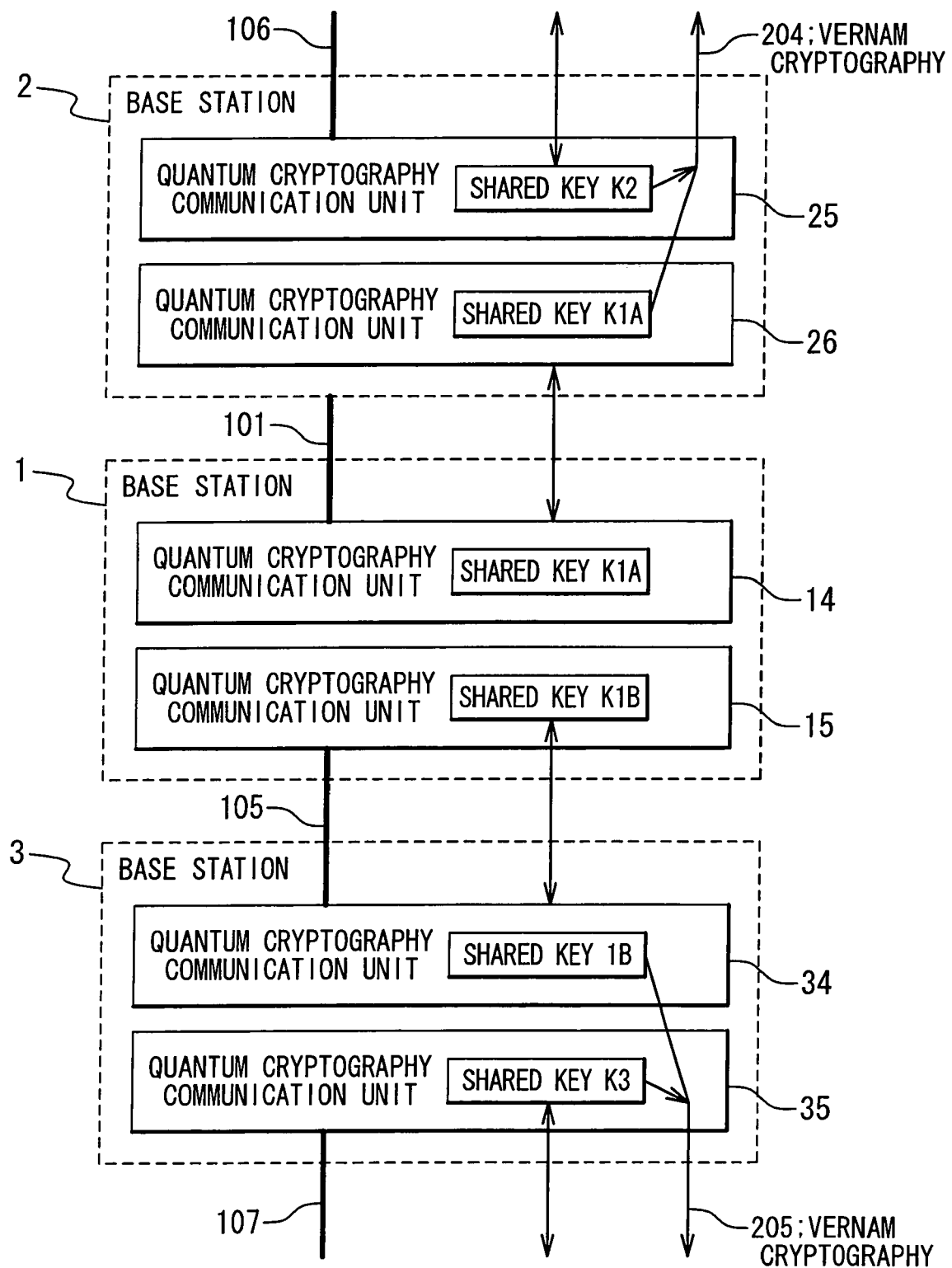
FIG. 8 is a block diagram showing the configuration of the quantum cryptography communication system according to a fourth embodiment of the present invention.

FIG. 8 is a schematic block diagram showing the configuration of the quantum cryptography communication system according to the fourth embodiment of the present invention. In FIG. 8, in the quantum cryptography communication system according to the fourth embodiment of the present invention, quantum cryptography shared keys "K1A" and "K1B" are distributed along a plurality of directions (namely, two directions in FIG. 8) from the base station 1.

In this quantum cryptography communication system, a base station 1 is connected to a base station 2 by an optical fiber 101; the base station 1 is connected to a base station 3 by an optical fiber 105; the base station 2 is connected to a next base station by an optical fiber 106; and the base station 3 is connected to a next base station by an optical fiber 107. Also, the respective base stations 1 to 3 are provided with quantum cryptography communication units 14 and 15, 25 and 26, and 34 and 35, which are capable of executing cryptographic communications with employment of quantum cryptography shared keys, respectively.

In this fourth embodiment, the quantum cryptography shared key "K1A" is distributed from the base station 1 to the next base station (not shown) by using the base station 2 as a relay point. Also, similarly, the quantum cryptography shared key "K1B" is distributed from the base station 1 to the next base station (not shown) by using the base station 3 as a relay point.

Figure 9:
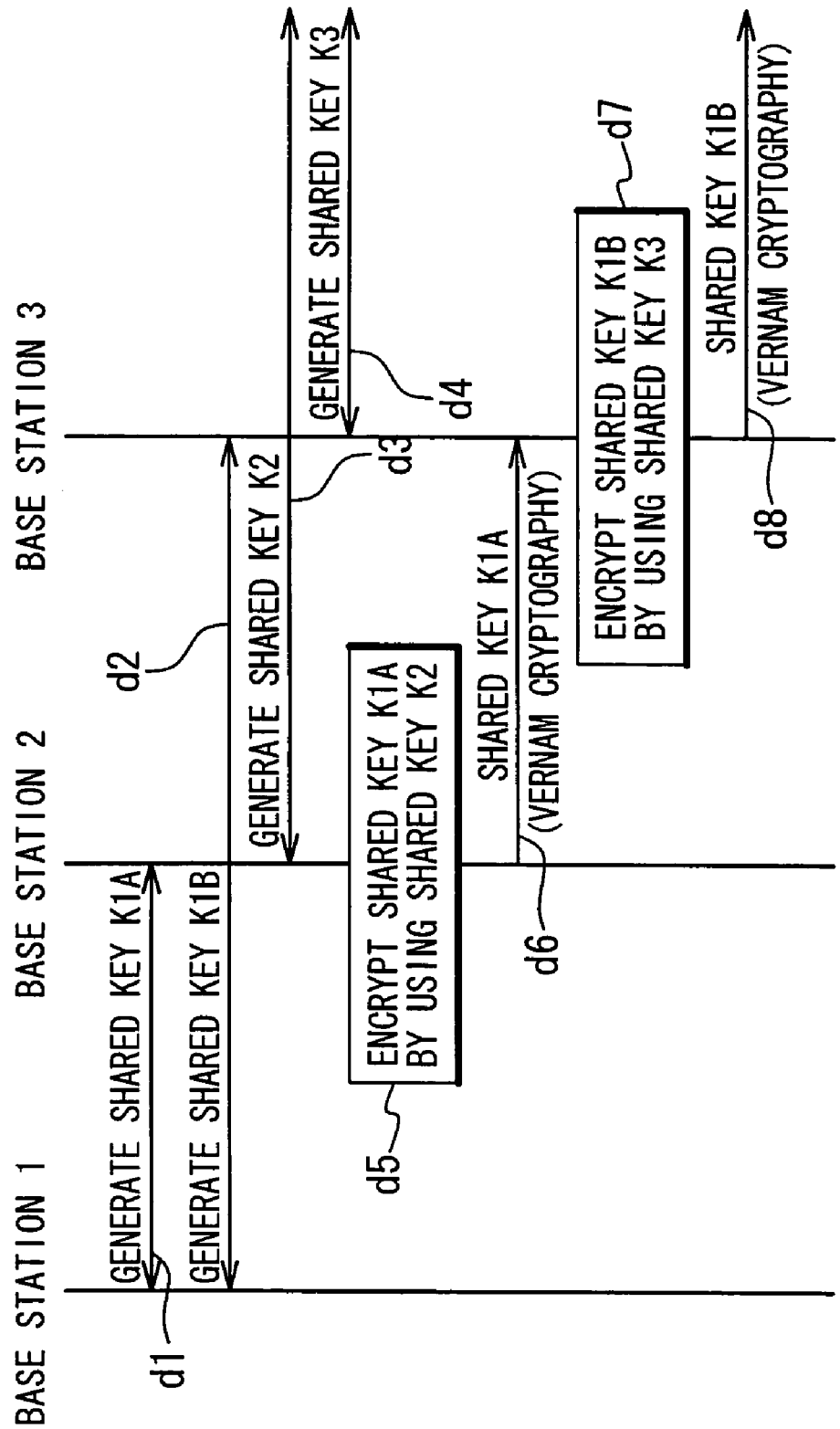
FIG. 9 is a sequence chart showing a distribution of a quantum cryptography shared key in the quantum cryptography communication system according to the fourth embodiment of the present invention.

FIG. 9 is a sequence chart showing distributions of the quantum cryptography shared keys in the quantum cryptography communication system according to the fourth embodiment of the present invention. Referring now to FIG. 7 and FIG. 8, the base station 1 generates the quantum cryptography shared key "K1A" based upon the quantum cryptography protocol with respect to the base station 2 (d1 of FIG. 9), and also, generates the quantum cryptography shared key "K1B" based upon the quantum cryptography protocol with respect to the base station 3 (d2 of FIG. 9). Also, the base station 2 generates a quantum cryptography shared key "K2" with respect to a next base station located adjacent to this base station 2 (d3 of FIG. 9). Also, the base station 3 generates a quantum cryptography shared key "K3" with respect to a next base station located adjacent to this base station 3 (d4 of FIG. 9).

As a consequence, the base station 2 encrypts the quantum cryptography shared key "K1A" by using this quantum cryptography shared key "K2" to produce a Vernam cryptograph 204 (d5 of FIG. 9), and then transmits the Vernam cryptograph 204 to the next base station on the optical fiber 106 (d6 of FIG. 9). In the next base station, the Vernam cryptograph 204 transmitted from the base station 2 is decrypted by using the quantum cryptography shared key "K2", so that the quantum cryptography shared key "K1A" is obtained.

Also, the base station 3 encrypts the quantum cryptography shared key "K1B" by using the quantum cryptography shard key "K3" to produce a Vernam cryptograph 205 (d7 of FIG. 9), and then transmits the Vernam cryptograph 205 to the next base station on the optical fiber 107 (d8 of FIG. 9). In the next base station, the Vernam cryptograph 205 transmitted from the base station 3 is decrypted by using the quantum cryptography shared key "K3", so that the quantum cryptography shared key "K1B" is obtained.

As a consequence, in this fourth embodiment, the quantum cryptography shared keys K1A and K1B can be distributed from the base station 1 to the next base stations which are present along a plurality of directions and are separated from the base station 1 by the distance longer than or equal to 100 Km, by using both the base station 2 and the base station 3 as the relay points.

FIG. 10 is a schematic block diagram showing the configuration of the quantum cryptography communication system according to the fifth embodiment of the present invention. In FIG. 10, in the quantum cryptography communication system according to the fifth embodiment of the present invention, a base station 1 encrypts a shared key (to be referred to as "distribution key" hereinafter) "K0" based upon a quantum cryptography shared key "K3" to produce a composite key. The base station 1 further encrypts the encrypted distribution key "K0" as the composite key based upon another quantum cryptography shared key "K1". The encrypted composite key is transmitted to a base station 3 via a base station 2. The quantum cryptography shared key "K1" is distributed to the base station 3 via the base station 2. Also, the quantum cryptography shared key "K3" is transmitted to the base station 3 via a base station 4. Thus, security of the distribution key "K0" is increased.

In this quantum cryptography communication system, the base station 1 is connected to the base station 2 by an optical fiber 101; the base station 1 is connected to a base station 4 by employing an optical fiber 102; the base station 2 is connected to the base station 3 by an optical fiber 108, and the base station 4 is connected to the base station 3 by an optical fiber 109. Also, the respective base stations 1 to 4 are provided with quantum cryptography communication units 16 and 17, 27 and 28, 36 and 37, and 42 and 43, which are capable of executing cryptographic communications with employment of quantum cryptography shared keys, respectively.

In this fifth embodiment, the distribution key "K0" is distributed from the base station 1 to the base station 3 by using the base station 2 as a relay point, and the quantum cryptography shared key K3 which has been used to encrypt the distribution key "K0" is transmitted from the base station 1 to the base station 3 by using the base station 4 as another relay point.

FIG. 11 is a sequence chart showing distributions of the quantum cryptography shared keys in the quantum cryptography communication system according to the fifth embodiment of the present invention. Referring now to FIG. 10 and FIG. 11, the base station 1 generates the quantum cryptography shared key "K1" based upon the quantum cryptography protocol with respect to the base station 2 (e1 of FIG. 11), and also, generates the quantum cryptography shared key "K3" based upon the quantum cryptography protocol with respect to the base station 4 (e2 of FIG. 11). Also, similarly, the base station 2 generates a quantum cryptography shared key "K2" with respect to the base station 3 (e3 of FIG. 11). The base station 4 generates a quantum cryptography shared key "K4" with respect to the base station 3 (e4 of FIG. 11).

The base station 1 encrypts the distribution key "K0" to be distributed to the base station 3 by employing the quantum cryptography shared key "K3" to produce the composite key (e5 of FIG. 11), and further encrypts the composite key based upon the quantum cryptography shared key "K1" to produce a Vernam cryptograph 206 (e6 of FIG. 11), and then transmits the Vernam cryptograph 206 to the base station 2 on the optical fiber 101 (e7 of FIG. 11).

On the other hand, the base station 4 encrypts the quantum cryptography shared key "K3" by using the quantum cryptography shared key "K4" to produce a Vernam cryptograph 208 (e8 of FIG. 11), and then transmits this Vernam cryptograph 208 to the base station 3 on the optical fiber 109 (e9 of FIG. 11). In the base station 3, the Vernam cryptograph 208 transmitted from the base station 4 is decrypted by using the quantum cryptography shared key "K4", so that the quantum cryptography shared key "K3" is obtained (e10 of FIG. 11).

The base station 2 decrypts the Vernam cryptograph 206 which has been transmitted from the base station 1 by using the quantum cryptography share key "K1" in order that the composite key is obtained (e11 of FIG. 11). Subsequently, the base station 2 encrypts this composite key by using the quantum cryptography shared key "K2" to produce a Vernam cryptograph 207 (e12 of FIG. 11), and then transmits this Vernam cryptograph 207 to the base station 3 on the optical fiber 102 (e13 of FIG. 11).

The base station 3 decrypts the Vernam cryptograph 207 which has been transmitted from the base station 2 by using the quantum cryptography shared key "K2" in order that the composite key is obtained (e14 of FIG. 11). Subsequently, the base station 3 decrypts this composite key by using the quantum cryptography shared key "K3" which has been obtained by decrypting the above-explained Vernam cryptograph 208 transmitted from the base station 4, so that the distribution key "K0" is obtained (el5 of FIG. 11).

As a consequence, in this fifth embodiment, the composite key is distributed from the base station 1 to the base station 3 which is separated from the base station 1 by the distance longer than or equal to 100 Km by using the base station 2 as the relay point. Also, the quantum cryptography shared key "K3" is distributed from the base station 1 to the base station 3 which is separated from the base station 1 by the distance longer than or equal to 100 Km by using the base station 4 as the relay point. Thus, the above-explained composite key is decrypted by using the quantum cryptography shared key "K3" so as to generate the distribution key "K0". As a result, the distribution key "K0" can be distributed to the base station 3 from the base station 1 in a safer manner.

The present invention can be applied to such data communication fields that higher security is required, for instance, defense fields, diplomatic fields, financial fields, and the like. Alternatively, the present invention may be applied to a data communication system, in which data is relayed, other than base stations. Further, although the Vernam cryptograph has been employed to encrypt the shared key and the plain text in the above-mentioned various embodiments of the present invention, other common key cryptography may be alternatively employed.

What is claimed is:

1. A quantum cryptography communication system comprising:
    a first data communication unit;
    a second data communication unit connected with said first data communication unit;
    a third data communication unit connected with said first data communication unit;
    a fourth data communication unit connected with said second and third data communication units, respectively,
    wherein a first shared key is generated in said first data communication unit and said second data communication unit,
    a second shared key is generated in said second data communication unit and said fourth data communication unit,
    a third shared key is generated in said first data communication unit and said third data communication unit,
    a fourth shared key is generated in said third data communication unit and said fourth data communication unit,
    said first data communication unit encrypts said first shared key by using said third shared key to produce a composite key, encrypts said composite by using said first shared key, and then transmits said encrypted composite key to said second data communication unit, and
    said second data communication unit decrypts said encrypted composite key to reproduce said composite key, encrypts said composite by using said second shared key, and then transmits said encrypted composite key to said third data communication unit,
    said third data communication unit encrypts said third shared key by using said fourth shared key, and then transmits said encrypted third shared key to said fourth data communication unit, and
    said third data communication unit decrypts said encrypted third shared key by using said fourth shared key to reproduce said third shared key, decrypts said encrypted composite key by using said second shared key to reproduce said composite key, and decrypts said composite key by using said third shared key to reproduce said first shared key.

2. The quantum cryptography communication system according to claim 1, wherein each of said encrypted composite key and said encrypted third shared key is transmitted as a Vernam cryptograph.

3. The quantum cryptography communication system according to claim 1, wherein each of said first to fourth data communication units is a base station.

4. A method of distributing a quantum cryptography key, comprising:
    generating a first shared key based on a protocol of quantum cryptography such that said first shared key is shared by a first data communication unit and a second data communication unit;
    generating a second shared key based on the protocol of quantum cryptography such that said first shared key is shared by said second data communication unit and a third data communication unit;
    encrypting said first shared key by using said second shared key in said second data communication unit to transmit the encrypted first shared key to said third data communication unit as a Vernam cryptograph;
    decrypting said encrypted first shared key by using said second shared key in said third data communication unit to reproduce said first shared key;
    generating a fourth shared key based on the protocol of quantum cryptography such that said fourth shared key is shared by said first data communication unit and a fifth data communication unit;
    generating a fifth shared key based on the protocol of quantum cryptography such that said fifth shared key is shared by said fifth data communication unit and a sixth data communication unit;
    encrypting said fourth shared key by using said fifth shared key in said fifth data communication unit to transmit the encrypted fourth shared key to said sixth data communication unit; and
    decrypting said encrypted fourth shared key by using said fifth shared key in said sixth data communication unit to produce said fourth shared key.

5. A method of distributing a quantum cryptography key, comprising:
    generating a first shared key based on a protocol of quantum cryptography such that said first shared key is shared by a first data communication unit and a second data communication unit;
    generating a second shared key based on the protocol of quantum cryptography such that said first shared key is shared by said second data communication unit and a third data communication unit;
    encrypting said first shared key by using said second shared key in said second data communication unit to transmit the encrypted first shared key to said third data communication unit as a Vernam cryptograph;
    decrypting said encrypted first shared key by using said second shared key in said third data communication unit to reproduce said first shared key;
    generating a sixth shared key based on the protocol of quantum cryptography such that said sixth shared key is shared by said first data communication unit and said second data communication unit;
    generating a seventh shared key based on the protocol of quantum cryptography such that said seventh shared key is shared by said second data communication unit and a seventh data communication unit;

encrypting said sixth shared key by using said seventh shared key in said second data communication unit to transmit the encrypted sixth shared key to said seventh data communication unit; and decrypting said encrypted sixth shared key by using said seventh shared key in said seventh data communication unit to produce said sixth shared key.

6. A method of distributing a quantum cryptography key, comprising:

generating a first shared key based on a protocol of quantum cryptography such that said first shared key is shared by a first data communication unit and a second data communication unit;

generating a second shared key based on the protocol of quantum cryptography such that said second shared key is shared by said second data communication unit and a fourth data communication unit;

generating a third shared key based on the protocol of quantum cryptography such that said third shared key is shared by said first data communication unit and a third data communication unit;

generating a fourth shared key based on the protocol of quantum cryptography such that said fourth shared key is shared by said third data communication unit and said fourth data communication unit;

encrypting said first shared key by using said third shared key to produce a composite key, in said first data communication unit;

encrypting said composite by using said first shared key in said first data communication unit to transmit said encrypted composite key to said second data communication unit;

decrypting said encrypted composite key to reproduce said composite key, in said second data communication unit;

encrypting said composite by using said second shared key, in said second data communication unit, to transmit said encrypted composite key to said third data communication unit;

encrypting said third shared key by using said fourth shared key in said third data communication unit to transmit said encrypted third shared key to said fourth data communication unit;

decrypting said encrypted third shared key by using said fourth shared key in said third data communication unit to reproduce said third shared key;

decrypting said encrypted composite key by using said second shared key in said third data communication unit to reproduce said composite key; and decrypting said composite key by using said third shared key in said third data communication unit to reproduce said first shared key.

* * * * *